United States Patent
Gupta et al.

(10) Patent No.: US 7,757,268 B2
(45) Date of Patent: Jul. 13, 2010

(54) POLICY BASED SERVICE MANAGEMENT

(75) Inventors: Rajiv Gupta, Los Altos, CA (US); Sekhar Sarukkal, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 992 days.

(21) Appl. No.: 10/866,508

(22) Filed: Jun. 12, 2004

(65) Prior Publication Data
US 2007/0124797 A1    May 31, 2007

Related U.S. Application Data

(60) Provisional application No. 60/489,911, filed on Jul. 25, 2003.

(51) Int. Cl.
*G06F 17/00* (2006.01)
(52) U.S. Cl. .................. 726/1; 726/3; 726/6; 709/223; 709/224
(58) Field of Classification Search ............ 726/1, 726/3, 6; 709/226, 229, 200, 224, 223; 707/9–10, 707/204; 705/44; 380/247, 270
See application file for complete search history.

(56) References Cited

U.S. PATENT DOCUMENTS

| | | | |
|---|---|---|---|
| 6,487,594 | B1 | 11/2002 | Bahlmann |
| 6,801,940 | B1 | 10/2004 | Moran et al. |
| 7,016,953 | B2 | 3/2006 | Lemon |
| 7,039,037 | B2 * | 5/2006 | Wang et al. .................. 370/349 |
| 7,103,876 | B1 | 9/2006 | Lopez et al. |
| 7,216,343 | B2 * | 5/2007 | Das et al. .................... 717/168 |
| 7,266,810 | B2 | 9/2007 | Karkare et al. |
| 7,272,625 | B1 * | 9/2007 | Hannel et al. ................ 709/200 |
| 7,437,752 | B2 * | 10/2008 | Heard et al. .................... 726/1 |
| 2003/0084168 | A1 * | 5/2003 | Erickson et al. ............. 709/229 |
| 2003/0225801 | A1 | 12/2003 | Devarakonda et al. |

(Continued)

OTHER PUBLICATIONS

Bloomberg, Jason, "Building Security Into a Service-Oriented Architecture," ZapThink, LLC, White Paper, Waltham, MA, May 2003, pp. 1-15.

(Continued)

*Primary Examiner*—Thanhnga B Truong
(74) *Attorney, Agent, or Firm*—Townsend and Townsend and Crew LLP

(57) ABSTRACT

A system and a method for policy management in a web services environment includes a policy design tool, a policy storage and a policy manager controller. The policy design tool creates (or updates) a policy for association with a web service. The policy storage stores the policy. The policy manager controller provides an interface for transmission of the policy to a policy enforcement tool and also receives messages relating to the policy from the policy enforcement tool. In addition, a system and method for policy enforcement in a web services environment includes a policy enforcement controller, a policy enforcement repository, an enforcer, a policy enforcement framework, and a policy container. The policy enforcement controller receives and commits a policy and the policy enforcement repository stores the committed policy. The enforcer module receives a request to invoke the policy and the policy enforcement framework determines whether the requested policy is committed in the policy enforcement repository and whether the policy is instantiated. The policy container determines whether the policy is enforceable.

11 Claims, 10 Drawing Sheets

U.S. PATENT DOCUMENTS

| | | |
|---|---|---|
| 2003/0229677 A1 | 12/2003 | Allan |
| 2004/0006760 A1 | 1/2004 | Gove et al. |
| 2004/0040014 A1 | 2/2004 | Ball |
| 2005/0172306 A1 | 8/2005 | Agarwal et al. |

OTHER PUBLICATIONS

Confluent Software, Inc., Internet Archive Wayback Machine, [online © 2001] [Retrieved on Feb. 18, 2004] Retrieved from the Internet<URL:http://web.archive.org/web/*/www.confluentsoftware.com>, p. 1.

Confluent Software, Inc., "Transform to Real-Time Enterprise," [online © 2002] [Retrieved on Feb. 18, 2004] Retrieved from the Internet<URL:http://web.archive.org/web/20021128005926/http://www.confluentsoftware.com/>, p. 1.

Confluent Software, Inc., Site Map, [online © 2002] [Retrieved on Feb. 18, 2004] Retrieved from the Internet<URL:http://web.archive.org/web/20030212235316/www.confluentsoftware.com/sitemap.html>, pp. 1-2.

Confluent Software, Inc., White Papers, [online © 2002] [Retrieved on Feb. 18, 2004] Retrieved from the Internet<URL:http://web.archive.org/web/20030202155155/www.confluentsoftware.com/solutions/whitepapers.html>, pp. 1-3.

Confluent Software, Inc., Case Studies, [online © 2002] [Retrieved on Feb. 18, 2004] Retrieved from the Internet<URL:http://web.archive.org/web/20030202153107/www.confluentsoftware.com/solutions/casestudies.html>, pp. 1-2.

Confluent Software, Inc., CORE Web Services Monitoring and Management, [online © 2002] [Retrieved on Feb. 18, 2004] Retrieved from the Internet<URL:http://web.archive.org/web/20030408031014/http://www.confluentsoftware.com/>, p. 1.

Confluent Software, Inc., Solutions, [online © 2002] [Retrieved on Feb. 18, 2004] Retrieved from the Internet<URL:http://web.archive.org/web/20021103121216/www.confluentsoftware.com/solutions/index.html>, pp. 1-3.

Confluent Software, Inc., Solutions: CORE Analyzer, [online © 2002] [Retrieved on Feb. 18, 2004] Retrieved from the Internet<URL:http://web.archive.org/web/20030202152959/www.confluentsoftware.com/solutions/coreanalyzer.html>, pp. 1-2.

Confluent Software, Inc., Solutions: CORE Integrator, [online © 2002] [Retrieved on Feb. 18, 2004] Retrieved from the Internet<URL:http://web.archive.org/web/20030202153730/www.confluentsoftware.com/solutions/coreinteg.html>, pp. 1-2.

Confluent Software, Inc., Solutions: CORE Manager, [online © 2002] [Retrieved on Feb. 18, 2004] Retrieved from the Internet<URL:http://web.archive.org/web/20030202154134/www.confluentsoftware.com/solutions/coremgr.html>, pp. 1-2.

LaMonica, Martin, "Web Services Start-up Cozies up to BEA," CNET News.com, [online] [Retrieved on Sep. 22, 2003], Retrieved from the Internet<URL: http://news.com.com/Web+services+start-up+cozies+up+to+BEA/2100-1001_3-985741.html>, p. 1.

Sarukkai, S. et al., "Web-service As a Layer-Six Technology," Confluent Software, Inc., © 2003, pp. 1-24.

Sarukkai, Sekhar et al., Loosely Coupled, "Web Services and the Forgotten OSI Layer Six," [online Sep. 5, 2003] Retrieved from the Internet<URL:http://www.looselycoupled.com/opinion/2003/saruk-osi-infr0905.html>, pp. 1-4.

WebServices.Org™, "Confluent Software Makes its Debut With New Web Services Platform," [online] [Retrieved on Sep. 22, 2003] Retrieved from the Internet<URL:http://www.mywebservices.org/index.php/article/articleprint/714/-1/2?P...>, pp. 1-5.

* cited by examiner (Policy Manager Architecture)

(Monitor)

(Development across multiple Development platforms)

(Policy manager)

(Policy enforcer)

(Federated policy manager)

POLICY BASED SERVICE MANAGEMENT

CROSS REFERENCE TO RELATED APPLICATIONS

This application claims a benefit of a priority filing date to U.S. Provisional Application Ser. No. 60/489,911, filed on Jul. 25, 2003, titled "Delegated Web-Service Policy Enforcement," and U.S. patent application Ser. No. 10/751,333, filed on Jan. 2, 2004, titled "Integration of Context-Sensitive Run-Time Metrics Into Integrated Development Environments, both of which are incorporated by reference.

BACKGROUND OF THE INVENTION

1. Field of the Invention

The present invention generally relates to the field of policy management, and more specifically, to policy based services management.

2. Description of the Relevant Art

Present enterprise information technology ("IT") infrastructures are complex, multi-vendor environments. Each entity has its own behavioral characteristics and configuration properties. Configuring the entire IT environment to produce a desired aggregate behavior proves to be a difficult problem. Each hardware component, network entity and software application needs to be configured in a specialized manner.

With complex interactions between different components, there is no easy way to know the overall impact of each local configuration change. Typically, a trial and error approach is used. For example, a configuration property may be changed in the procurement application to double the number of clients that can simultaneously order supplies. However, soon after the change IT operators may realize that this configuration change can cause the overall performance of a critical order-management application to deteriorate because both applications route requests through the same web-server.

These kinds of problems have been explored in other domains, such as network management and storage management. From these, a very useful technique that has emerged is policy-based management. Policies allow an administrator to represent their desired behavior in a vendor-independent way. Policy-management products take these requirements and automatically map them to lower-level configuration for multiple heterogeneous systems. Policy managers analyze the requested policy and informing the administrator about the feasibility and impact of the desired policy.

In the example provided above, the IT administrator may request "I need more throughput for the procurement application." The policy manager would know that the policy could be achieved by increasing the client-count property on the procurement application, but that such a change would cause deterioration of a critical order-management application. Armed with this analysis, the policy manager may offer a range of options to the administrator. For example, it may offer to force the change regardless of the impact, to allocate more machines to the web-server cluster, or to delay the change until more hardware can be acquired. That is, policy-oriented configuration abstracts the details of each application's configuration and aggregates them into goal-oriented choices that provide ease of use for IT administrators.

However, as enterprise applications have become increasingly distributed and draw upon shared resources, application management has not provided a policy-oriented approach that has had some success in these other domains. As an example, consider that there are two ways in which web-services impact policy-based management. The first way is standardization in application infrastructure makes application policy-management feasible. The second is application interactions increase and become wider in scope, making policy management vital.

With respect to the former example, a policy-based management works when there is a high degree of standardization on the components being managed. Such an approach has been successful in storage management, where there are well-defined interfaces for managing files and blocks. Likewise, applying such an approach in network management, routers and switches have well-defined tasks and there is a large body of shared knowledge on the implication of different configuration settings. By contrast software applications have tended to perform very proprietary tasks and are usually configured in proprietary ways, hence, having almost no policy management.

With respect to the latter example, many software applications are moving from a distributed systems model with centralized control to distributed systems with decentralized control. A difference in this shift is in the ownership of the interacting components. Previously, most, if not all, software that interacted with each other resided in a single trusted domain and could be managed centrally. Now, as interactions span organizational and company boundaries, it is impossible to administer, configure and update software systems centrally.

The problems caused by decentralized control are manifold. First, getting things to work is much more difficult because it is not possible to control both sides of the interaction. Well-defined interfaces are still important, but just as important, are all the operational details that are required to make the interaction work, and which are not specified in the interface definition. Details such as authentication method being used, number of concurrent connections accepted, session timeout, encryption parameters and the like are all important details necessary to make interactions work. This information has usually been transferred informally through documents, word-of-mouth or by encoding such parameters inside libraries. There is a lack of formal ways to represent and expose this policy-information so that consumers that want to talk to a service can query it and get policy-information about the service.

Second, as interactions cross-organizational boundaries, every interaction involves usage of resources owned by other parties. Attaining a certain quality of service for the applications becomes a shared responsibility and requires tools that allow administrators to expose configuration information to each other, as well as control each other's configuration in controlled ways. Third, decentralized control makes it harder to change configurations and upgrade systems. It is no longer possible to do synchronize systemic changes. Maintaining backward compatibility across all interacting parties becomes more difficult to achieve.

Hence, there is a need for infrastructure software that helps developers and administrators to administer software systems across organizational boundaries.

SUMMARY OF THE INVENTION

The present invention includes a system and a method for creating, managing and enforcing policies for web services. In one embodiment, a web services environment includes policy manager, a policy enforcer, a client, and a service. The client includes software requesting a service. A service is a web service, for example, an application or operational (or functional) process such as a login procedure and interface and encryption of messages.

The policy manager is configured to specify functionality such as logging, authentication, encryption, caching, which are not necessarily core business logic, but do provide non-functional offerings that are addressable by, for example, a developer. The policy manager is configured to help separate business concerns from non-business concerns. The policy enforcer is configured to monitor and enforce policies configured via the policy manager.

The policy manager communicatively couples the policy enforcer, either directly or indirectly. The policy enforcer couples the client with the service and may be configured on the client side, the service side, as an intermediary between the client and the service, or partially on the client side and partially on the service side.

In one embodiment, a policy manager includes a policy design tool, a policy storage, and a policy manager controller. The policy design tool communicatively couples the policy storage and the policy manager controller. The policy design tool is configured to create a policy for association with a web service. The policy storage is configured to store the created policy. The policy manager controller is configured to provide an interface for transmission of the created policy to a policy enforcement mechanism and is also configured to receive messages relating to the policy from the policy enforcement mechanism. Thus, the policy manager provides a central location to create, manage, and distribute policies for use with a web services environment.

Likewise, in one embodiment, a policy enforce includes a policy enforcement controller, a policy enforcement repository, an enforcer module, a policy enforcement framework, and a policy container. The policy enforcement controller is configured to receive a policy and commit it. The policy enforcement repository is communicatively coupled with the policy enforcer and is configured to store the committed policy. The enforcer module is configured to receive a request to invoke the policy. The policy enforcement framework is communicatively coupled with the policy enforcer and is configured to determine whether the policy requested is committed in the policy enforcement repository and whether the policy is instantiated. The policy container communicatively coupled with the policy enforcement framework and is configured to determine whether the policy is enforced. Thus, the policy enforcer provides a mechanism to ensure a policy is committed, instantiated and enforced before invoking a web service for a client.

The present invention advantageously provides a policy framework for use in a web services environment to help further application development in a consistent and manageable manner. This decreases development cycle time and increases application availability and consistency. Specifically, control over rules for application development is provided within a framework that requires adherence to in order to make a web service available to an application.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE SEVERAL VIEWS OF THE DRAWINGS

The invention has other advantages and features which will be more readily apparent from the following detailed description of the invention and the appended claims, when taken in conjunction with the accompanying drawings, in which:

Figures ("FIGS.") 1a through 1d illustrate various embodiments for a web services environment with a policy management system in accordance with the present invention.

DETAILED DESCRIPTION OF THE INVENTION

The Figures and the following description relate to preferred embodiments by way of illustration only. This discussion herein includes detailed description of various embodiments of a system and a method for creating, managing and enforcing a policy (-ies) for web services during a lifecycle of a policy. A policy includes a set of rules and logic consistently applied across development, staging and production environments of an application applied by intercepting communication between a client and a service or by in-process interception in the client or service applications. The rules and logic include, for example, business rules and logic that oftentimes are dictated by an organizational entity rather than functionally in an application such as whether or not particular applications should include authentication, encryption, login procedures, etc.

A policy lifecycle includes creation of a policy (e.g., defining a new policy and its parameters—business rules and business logic), testing the policy (e.g., deploying or simulating application of it), using the policy (e.g., putting the policy in production in an service (including application) environment), and depreciating the policy (e.g., updating it, rolling it back, or deleting it). In one embodiment, the policy lifecycle tracks an application lifecycle, which includes creation (or development), staging (or testing), and deployment (or production). Such a configuration beneficially allows for a policy and application to appropriately change in parallel if desired.

As an example, at a creation stage a web-service based retail transaction application may functionally include an initial prototype of the transaction engine. An associated policy will be defined/created that integrates 8-bit encryption to determine whether and how such encryption works with the transaction engine. Thereafter, the application will be staged (or tested), for example, in a beta environment. Similarly, the associated policy is also tested, and may be tested with a more robust service, for example, 64-bit encryption to measure performance in a more rigorous environment that is closer to production.

Next the application may be deployed (or in production). At this stage, the associated policy is also deployed and may also be further enhanced, for example, with 128-bit encryption due to market demands. While the application is deployed, the policy may be depreciated such that the 128-bit encryption may be updated or replaced with 256-bit encryption, without affecting the application deployment. Further, if the application is deleted, the associated policy may also be deleted. Hence, as further described herein, embodiments of the present invention beneficially allow for creation, management and enforcement of policies in a manner that aligns business process goals with application development and deployment considerations.

Figure 1A:
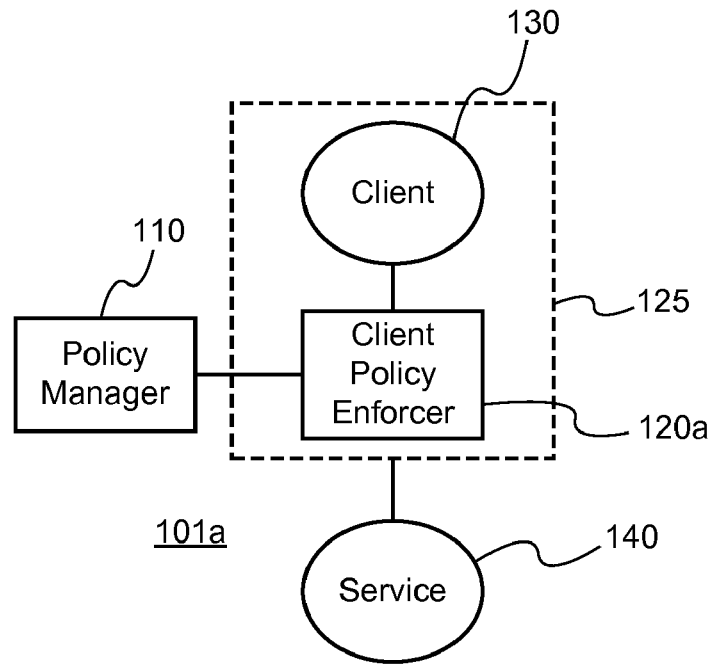

Turning now to FIGS. 1a through 1d, illustrated are various embodiments for a web services environment with a policy management system (generally 101) in accordance with the present invention. Referring to FIG. 1a, a first embodiment of a web services environment with a policy management system 101a includes policy manager 110, a client policy enforcer 120a, a client 130, and a service 140.

The policy manager 110 is configured to specify service offerings, for example, security related offerings such as logging, authentication, or encryption or processing related offerings such as caching or batch processing. These service offerings are orthogonal to the functional interface exposed by the core business logic, but address non-functional aspects such as availability, failover, security, normalization, versioning and the like, that do not impact the actual functional interface that are configurable by, for example, a developer. In one embodiment, the policy manager 110 is configured to assist with separation of core business offerings from non-core business offerings.

The policy enforcer (generally 120) is configured to monitor and enforce policies developed and established in the web services environment. Specifically, the policy enforcer 120 is configured to receive, commit, instantiate and enforce policies created or updated by the policy manager 110 and that are invoked in response to a client 130 request requesting a service 140.

The client 130 includes an application that requests (or invokes) a service 140. In one embodiment, the client 130 transmits (or sends) an extensible mark-up language ("XML") or Simple Object Access Protocol ("SOAP") message to invoke the service 140. The application may be configured in software, hardware, or a combination of hardware and software (including firmware).

The service 140 is a web service, for example, an application or operational (or functional) process. In one embodiment, the service 140 is an addressable entity on a network that exposes a public interface (e.g., XML or SOAP) that may be remotely invoked by the client 130. An example of a service includes a business-to-business application in which a remote broker application (e.g., client) requests a quote service on a portal to perform a credit check (e.g., a service) or verify a vehicle identification number (e.g., another service).

The policy enforcer (generally 120) may be structured in different configurations with respect to the other components of the web services environment policy management system (generally 101). For example, in the first embodiment of the web services environment with the policy management system 101a, the policy manager 110 communicatively couples the client policy enforcer 120a. The client policy enforcer and the client communicatively couple together as a client side policy enforcement system 125. The client side policy enforcement system 125 communicatively couples the service 140, for example, through an interface on the client policy enforcer 120a. The client side policy enforcement system 125 is particularly suited for policies specific to client-centric applications and focus, for example, insertion of a security token or user credentials before sending a message to a service, or signing the message if the service accepts only signed messages or the like.

Figure 1B:
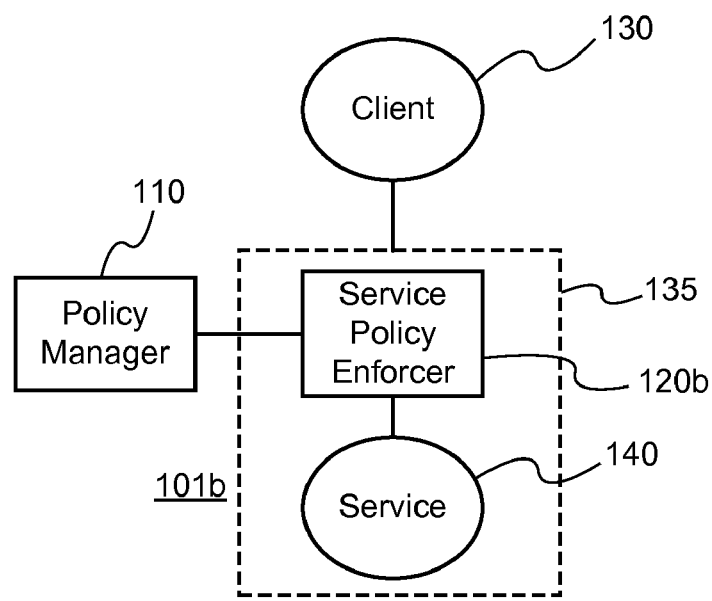

FIG. 1b illustrates a second embodiment of a web services environment with a policy management system 101b. The second embodiment includes the policy manager 110, a service policy enforcer 120b, the client 130, and the service 140. In this embodiment, the service policy enforcer 120b and the service 140 couple together for a service side policy enforcement system 135. The policy manager 110 and the client 120 communicatively couple with the service side policy enforcement system 135, for example, through appropriate interfaces on the service policy enforcer 120b. The service side policy enforcement system 135 is particularly suited for policies specific to services-centric applications and focus, for example, authentication of a user credentials before invoking a service, or verification of signatures in a message, or the like.

Figure 1C:
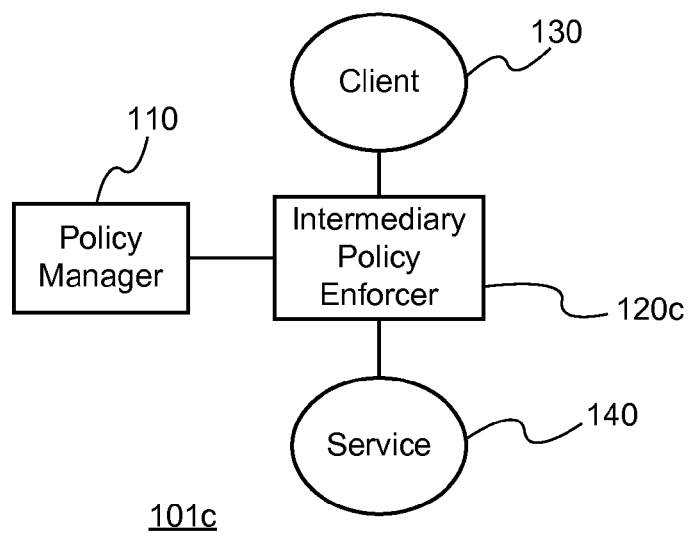

FIG. 1c illustrates a third embodiment of a web services environment with a policy management system 101c. The third embodiment includes the policy manager 110, an intermediary policy enforcer 120c, the client 130, and the service 140. In this embodiment, the intermediary policy enforcer 120c communicatively couples the policy manager 110, the client 130, and the service 140. The intermediary policy enforcer 120c is particularly suited for policies that are neutral with respect to the other components in the web services environment, for example, collecting invocation metrics for billing or charge-back, protocol transformation (e.g., from HTTP to MQ) and the like.

Figure 1D:
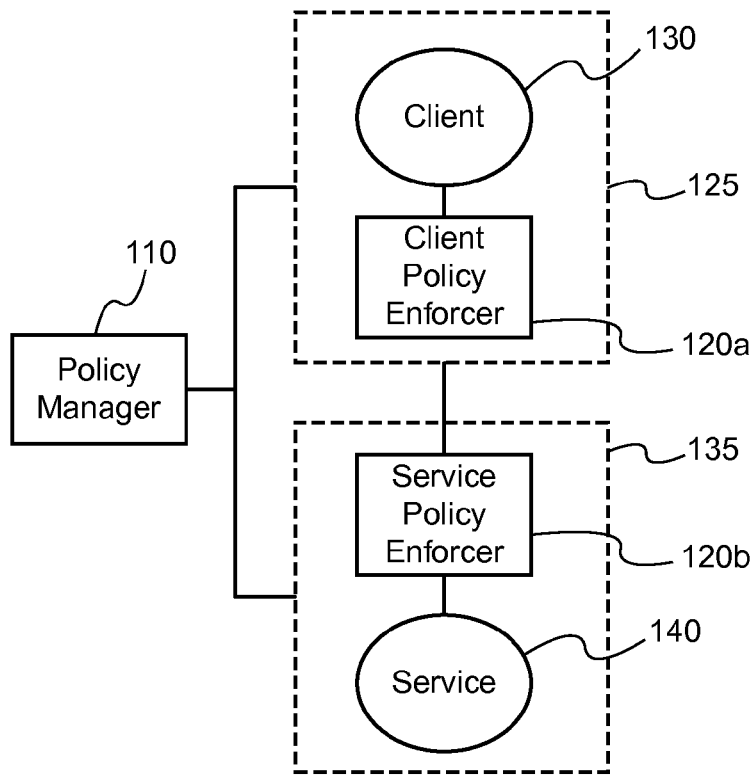

FIG. 1d illustrates a fourth embodiment of a web services environment with a policy management system 101d. The fourth embodiment includes the policy manager 110, the client policy enforcer 120a, the service policy enforcer 120b, the client 130, and the service 140. In this embodiment, the client services policy enforcer 120a and the client 110 couple together for the client side policy enforcement system 125 and the service side policy enforcer 120b and the service 140 couple together for the service side policy enforcement system 135. The policy enforcers 120a, 120b may also include appropriate interfaces to couple the client side policy enforcement system 125 with the service side policy enforcement system 135. The policy manager 110 communicatively couples the client side policy enforcement system 125 and the service side policy enforcement system 135, for example, through an interface in the client policy enforcer 120a and the service policy enforcer 120b. This embodiment of the policy management system 101d is particularly suited for a distributed web services environment such as coexistence of the examples described above.

Figure 2A:
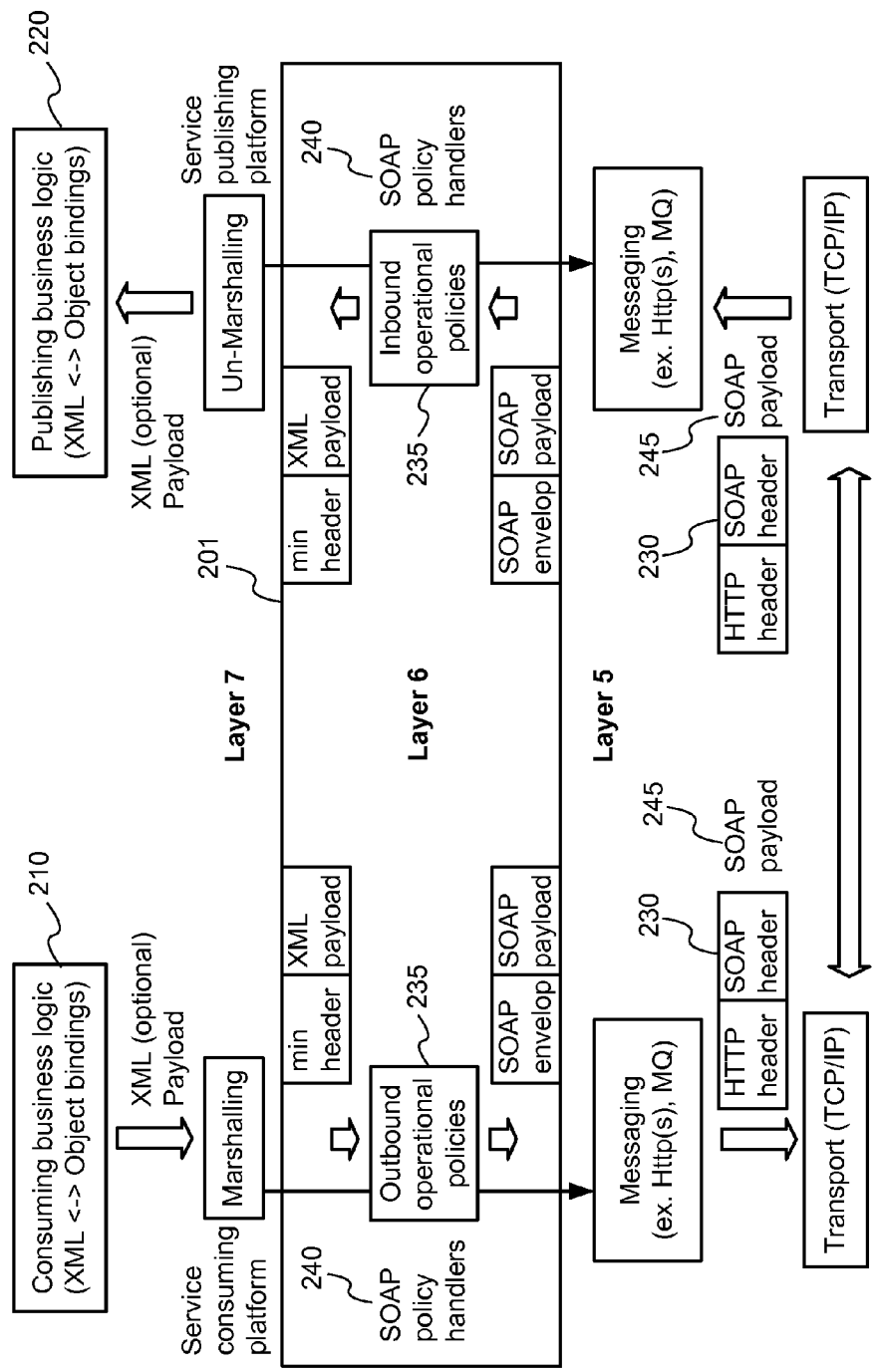
FIGS. 2a and 2b illustrate embodiments of policy manager architecture in a context of an open systems interconnect ("OSI") layer architecture in accordance with the present invention.
Figure 2B:
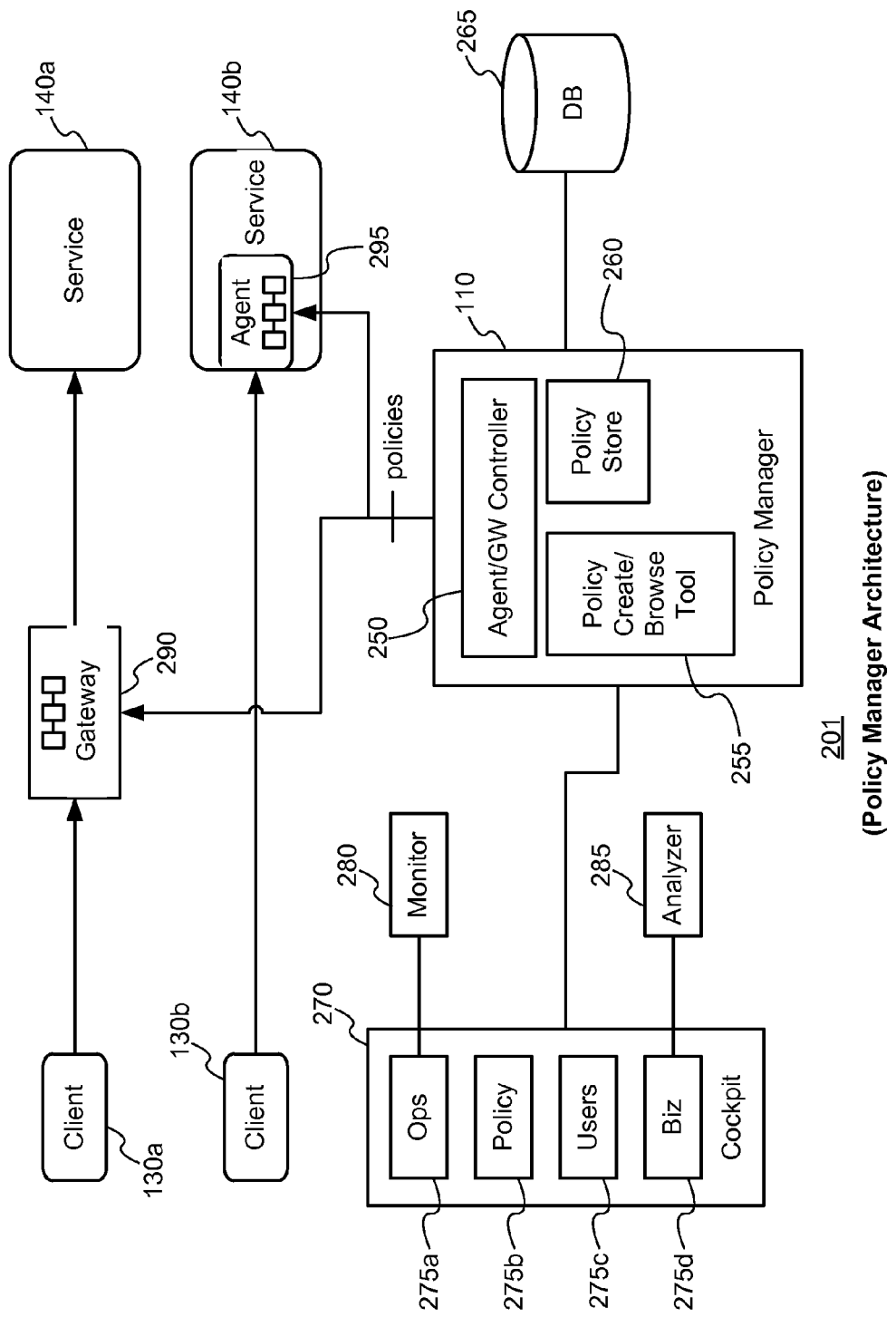

FIGS. 2a and 2b illustrate embodiments of policy management system (generally 201) architecture in a context of an open systems interconnect ("OSI") layer stack architecture in accordance with the present invention. FIG. 2a illustrates an embodiment of a policy management system 201a with the policy manager 110 as a layer-six 210 offering in the OSI stack. Generally, in a seven-layer OSI stack, the top three layers are usually bracketed together as "application layers,"

and the bottom four are bracketed together as "lower layers" or "presentation layers." Note, however, that the demarcation of boundaries between the application and presentation layers is sometimes fluid. In addition, by way of example, the system shows an outbound process chain 210, for example, from the client 130 to the service 140, and an inbound process chain 220, for example, from the service 140 to the client 130.

Conventionally, layered architecture requires that applications to make use of facilities supported in lower layers in the network stack by delegation. In this model, applications do not change with changing configurations or policies at lower layers. For example, whether the session protocol used by the web server is HTTPS or HTTP, a web application (for example, a Java service provider ("JSP") or an application service provider "ASP") is not written differently. Rather, the transfer is handled as a session/transport layer binding (layers 4/5) that is set by appropriate web server deployment-time configurations.

Mature standards and products have helped applications abstract out functionality at the session layer and below. However, conventional layer-six operations that do not belong in the application layer are implemented as an integral part of the application code. This intertwined relationship between application logic and application policies have made it very difficult to determine if conventionally layer six offerings are a theoretical concept or even achievable in practice.

In one embodiment in accordance with the present invention, a policy management system 201a leverages web service standards, for example, use of Simple Object Access Protocols ("SOAP") headers 230 to standardize sharing of context and operational policies 235 (e.g., credential-based authentication, quality of service ("QoS") routing, compression, encryption; caching, data validation, and protocol/data normalization) may be implemented and configured as layer-six functionality. Implemented as message interceptors, either in process as SOAP handlers 240, or as out-of-process SOAP intermediaries implementing layer-six (OSI model) functionality, the policies can seamlessly be introduced in the path of message flows to and from applications, without developer intervention. These processes may be managed through a policy handler, policy controller, and a policy monitor within layer-six and as further described herein.

One embodiment of a policy management system 201 architecture for implementation of layer-six functionality includes configuring standards that are agnostic of the transport (typically layer 5 and below) or messaging model (synchronous, asynchronous, conversational, etc), standardizing separation of message context and message content, structuring a pervasive framework in place for seamless interception of messages via SOAP handler chains (outbound, inbound) 210, 220, and centralizing management and monitoring of layer-six policies enabling deployment and change of policies from a central location. Hence, in this model, layer-seven applications need not be aware of the existence of headers 230 and are only aware of the payload 245. The entire SOAP envelope is packaged into transport-specific packets by lower layers in the OSI stack.

Turning to FIG. 2b, it illustrates another embodiment of a policy management system 210b in accordance with the present invention. This embodiment illustrates the policy manager 110, the one or more clients (generally 130), and one or more services (generally 140). In addition, this embodiment of the policy management system 210b includes a user cockpit (or interface) 270, a monitor 280, an analyzer 285, and a gateway 290.

The client 130a, 130b communicatively couples (either logically or physically) respectively with a service 140a through a gateway 290 coupled with it or with a service through an agent 295 coupled with it. The gateway 290 and the agent 295 also couple with the policy manager 110 for communication of policies. The gateway 290 and the agent 295 intercept messages to enforce operational policies. In one embodiment, the gateway 290 is external to the service while the agent 295 is integrated with the service. The policy manager 110 also communicatively couples with the user interface 270. The user interface 270 couples with the monitor 280 and the analyzer 285.

In this embodiment, the policy manager 110 is configured to include a controller 250 (or agent), a policy creation/browse tool 255, and a policy store 260. The controller 250 is configured to communicate updated or new policies that are or can be enforced at the gateway 290 or agent 295. The policy creation/browser tool 255 is configured to allow developers or other users to design policies via a graphical or programmatic interface. This designed policy is then managed and communicated to the gateway 290 or agent 295 by the agent controller. The policy store 260 is configured to store policies created by the policy create/browse tool 255 as well as allow for browsing by the tool 255 of the policies that are stored on the database 265.

The user interface 270 is configured to provide a user, e.g., a developer, access to the policy manager 110 to manage policy related actions such as operations associated with the policies 275a, policy creation 275b, user attributes with respect to created policies 275c, and business processes associated with the policy 275d. In one embodiment, the monitor 280 couples with the operations 275a to provide monitoring views regarding availability, performance, security, and the like, that in turn can feedback into the policy manager 110.

Figure 3A:
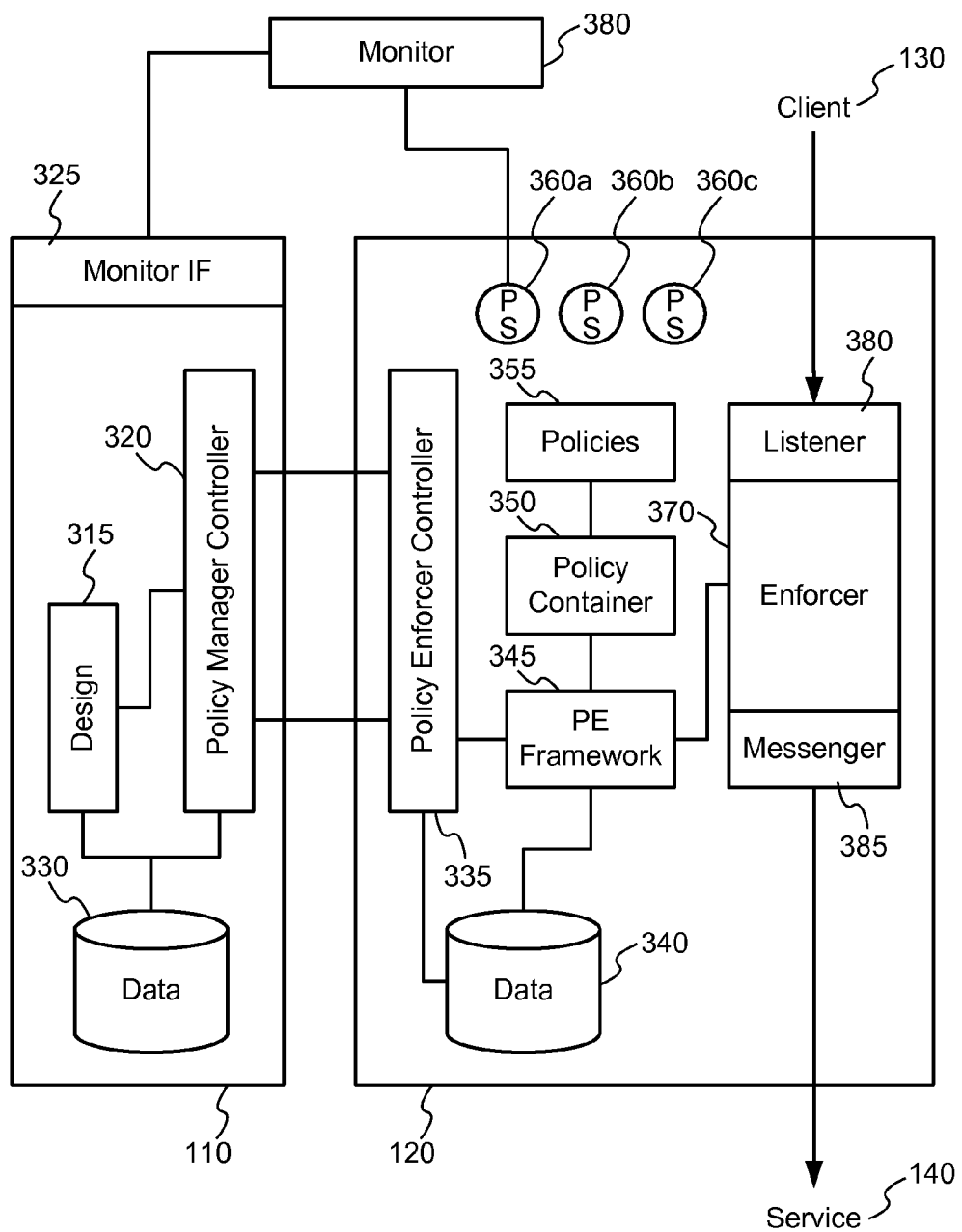
FIG. 3a illustrates an embodiment of communication between a policy manager and policy enforcer in a policy management system in accordance with the present invention.

Turning now to FIG. 3a, it illustrates an embodiment of communication between the policy manager 110 and the policy enforcer 120 in a policy management system 301 in accordance with the present invention. The policy management system 301 includes the policy manager 110 coupled with the policy enforcer 120. In addition, a monitor 380, which includes the functionality of the monitor 280 described above, couples the policy manager 110 and the policy enforcer 120. The policy enforcer 120 couples the client 130 and the service 140.

In this embodiment, the policy monitor 110 includes a policy design module 315, a policy manager controller 320, a monitor interface 325, and a policy manager storage 330. The policy design module 315 communicatively couples the policy manager controller 320, the policy manager storage 330 and also the monitor interface 325. The policy manager controller 320 couples the policy manager storage 330 and is also configured to communicatively couple a policy enforcer. It is noted that the policy design module 315 may include functionality of the policy create/browser tool 255 and the policy manager controller 320 may include functionality of the controller 350, both of which are described above.

Also in this embodiment, the policy enforcer 120 includes a policy enforcer controller 335, a policy enforcer storage 340, a policy enforcer framework 345, a policy container 350, one or more policies 355, one or more policy steps (generally 360), and an enforcer 370. A listener 380 and a messenger 385 may be integrated with the policy enforcer 120 or may be an interfaced with their functional components external to the policy enforcer 120 configuration. The policy enforcer controller 335 communicatively couples with a policy manager as well as the policy enforcer storage 340 and policy enforcer framework 345. The policy enforcer framework 345 couples the policy enforcer storage 340, the policy container 350, the enforcer 370. The policy container 350 couples the one or more policies 355, which couples the one or more policy steps 360. The enforcer 370 couples the listener 380 and messenger 370.

Figures 4, 5A:
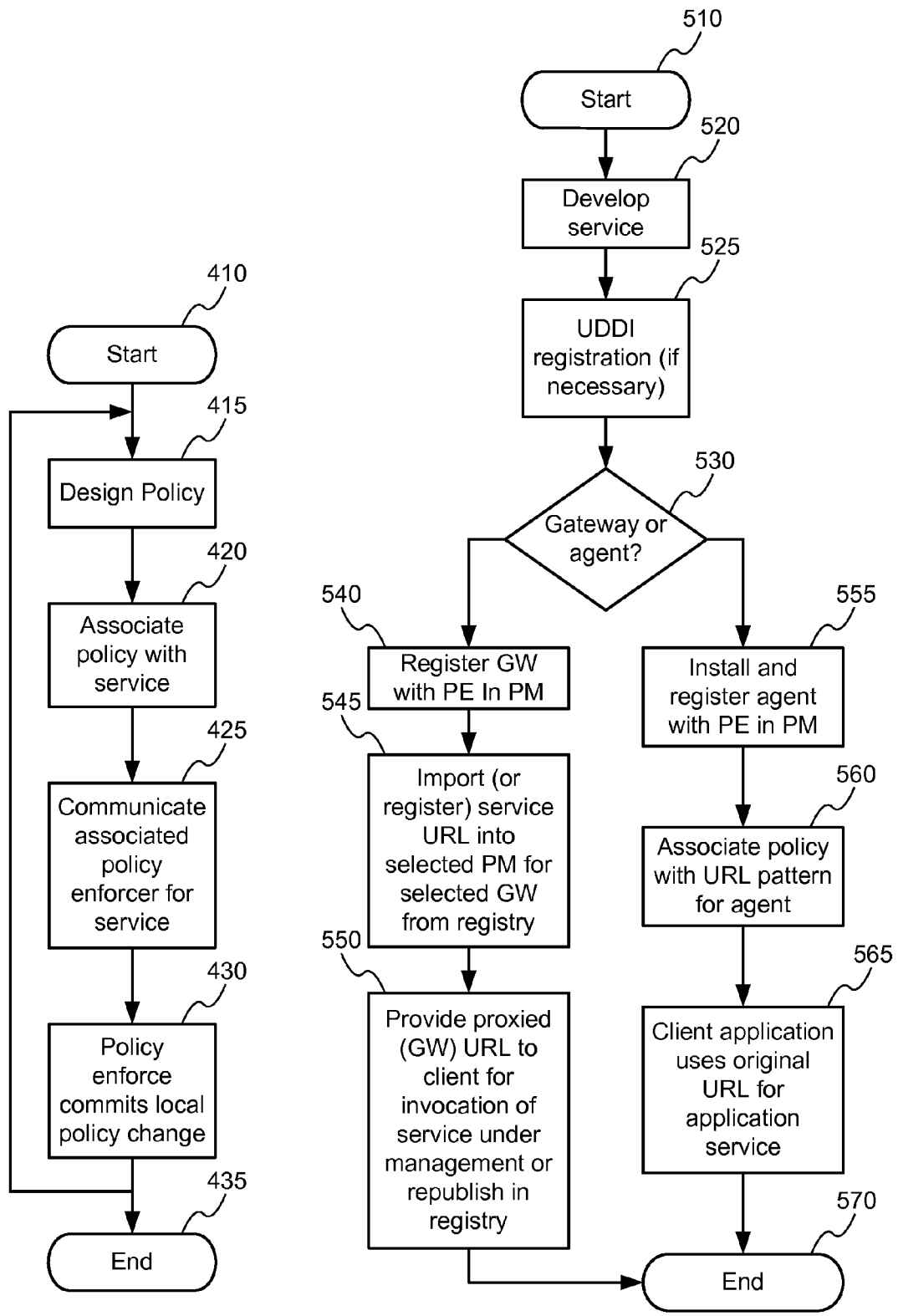
FIG. 4 illustrates an embodiment of a process for designing and enforcing a policy in accordance with the present invention.
FIG. 5a illustrates an embodiment of a process for associating a policy with a service in accordance with the present invention.

Referring now to functional operation of the policy manager, FIG. 3a in conjunction with FIG. 4 illustrates an embodiment of a process for designing and enforcing a policy in accordance with the present invention. The process starts 410 with designing 415 a policy (-ies). The policy design module 315 is configured to provide an interface and tools for a user, e.g., a developer, or the policy manager, e.g., through a feedback mechanism, to define, develop, create, update and/or associate policies (generated policies) for a service. The generated policy may also be committed within the policy manager 110 prior to sending to the policy manager controller 315.

Figure 5B:
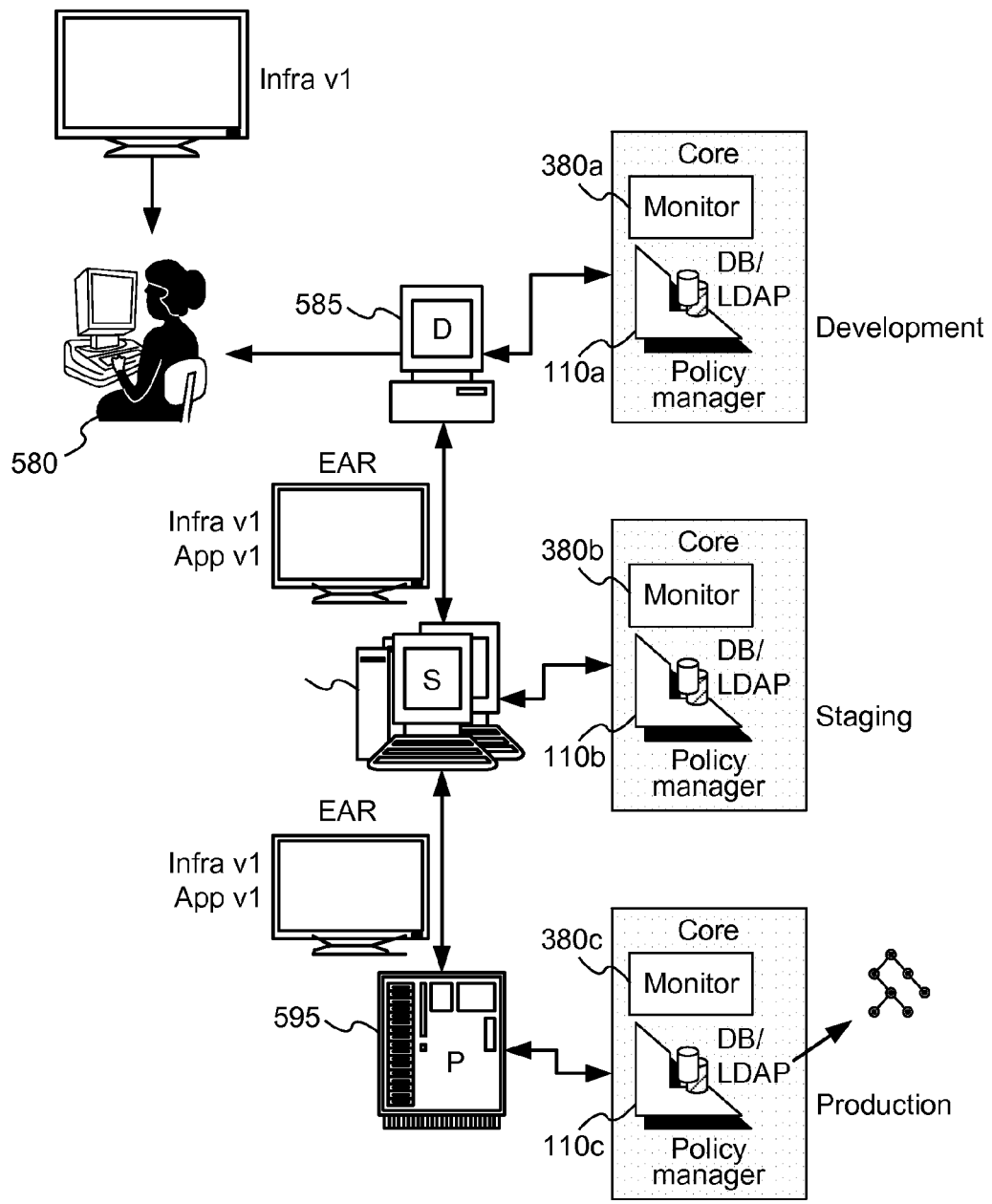
FIG. 5b illustrate an embodiment of a process and a system for developing and deploying a policy across development platforms in accordance with the present invention.

When the policy design module associates 420 the designed policy with a service, the generated policy is communicated 425 to a policy enforcer through the policy manager controller 320. FIG. 5a illustrates an embodiment of a process for associating a policy with a service in accordance with the present invention. The process starts 510 and a particular service is developed or has been developed 520. Briefly FIG. 5b illustrates an embodiment for a developed service that is available across at least three platform, which the policy will ultimately also traverse in accordance with the present invention. Specifically, a user, e.g., developer, 580 on a development platform 585 develops (or creates) a service that is thereafter integrated into a staging platform 590 and production platform 595. Hence, a policy manager 110a, 110b, 110c on each platform 585, 590, 595 will need access to the policy that will be associated with the service.

Referring back to FIG. 5a, once the service is developed 520, it may need to work through an optional universal description, discovery and integration ("UDDI") registration process 525 that registers the service in an appropriate registry. The service may then be accessible through a gateway or an agent (e.g., gateway 290 or agent 295). Hence, at this point the process determines 530 whether the service will be available through a gateway or an agent.

If the service will be offered through a gateway, the process registers 540 the gateway with a policy enforcer in a database in the policy manager 110. The process then imports (or registers if the policy manager functions in a registration capacity) 545 a uniform resource locator ("URL") for the selected gateway from the UDDI registry into the database in the policy manager 110 (which, if there is more than one policy manager, one is selected as a central database). The process continues with providing 550 a proxied URL to the client for invocation f the service under management or republishing in the UDDI registry before ending 570.

If the service will be offered through an agent, the process installs and registers 550 the agent with a policy enforcer in the policy manager 110. The process then associates 560 a policy for the service with a predefined URL pattern (or structure) identifying the agent. The client application then uses 565 an original URL for the application service, but the policy enforcer is able to route requests to the appropriate service based on the policy requested and registered. The process then ends 570.

Referring again to FIGS. 3a and 4, policies generated or updated by the policy design module 315 may also be stored in the policy manager storage 330 (with or without being committed). The policy manager controller 320 receives generated policy (-ies) from the policy design module 315, or retrieves a policy (-ies) from the policy manager storage 330 and transmits it to a policy enforcer, for example, as an XML message that has policy CRUD ("create, read, update, delete") characteristics. The policy manager controller 320 also receives messages from a policy enforcer, such as request for updates of a policy or receipt of a transmitted policy.

Figure 6:
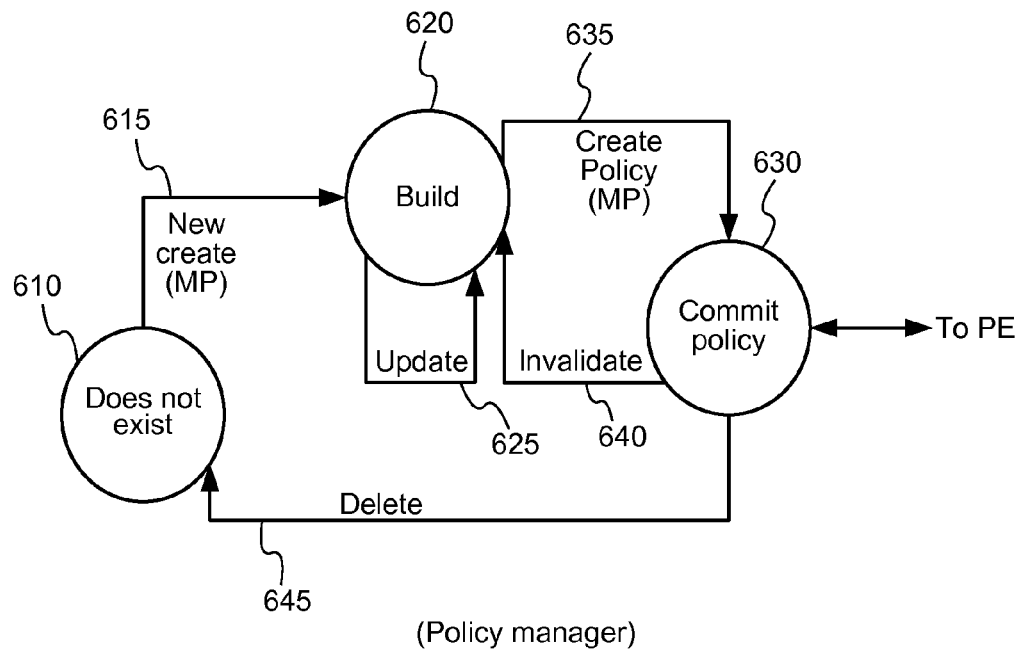
FIG. 6 illustrates an embodiment of a process for managing policies through a policy manager in accordance with the present invention.

FIG. 6 illustrates an embodiment of a process for managing policies through the policy manager 101 in accordance with the present invention. Specifically, if a policy does not exist 610, a create metapolicy ("MP") 615 is used to transmission to a build 620 state to build the policy. A metapolicy is a link between states and includes a rule that determines or controls state changes in a lifecycle of a policy.

Once the policy is built 620, a create metapolicy 635 transitions to a commit 630 state where the policy is committed locally before transmission to a policy enforcer. Committed policies may also be deleted. If deleted, a delete metapolicy 645 transitions to the does not exist/no longer exists 610 state because the policy is deleted an no longer in existence. From the commit policy state 630, a policy may be invalidated, e.g., due to an update of that policy. If invalid, an invalidate metapolicy 640 transitions back to the build state so that the policy may be updated 625 and then transitioned again to the commit policy state 630.

Turning back to FIGS. 3a and 4, in the policy enforcer 120, the policy enforcer controller 335 receives a policy (-ies) from a policy manager and commits 430 them. The policy enforcer controller 335 can also store the policy in the policy enforcer storage 340 and inform other components, for example the policy enforcer framework 345 of updates, deletions, etc., of actions that may affect a policy. With the policy committed 430 in the policy enforcer 120, the policy is ready for use with the service with which it is associated.

Figure 7:
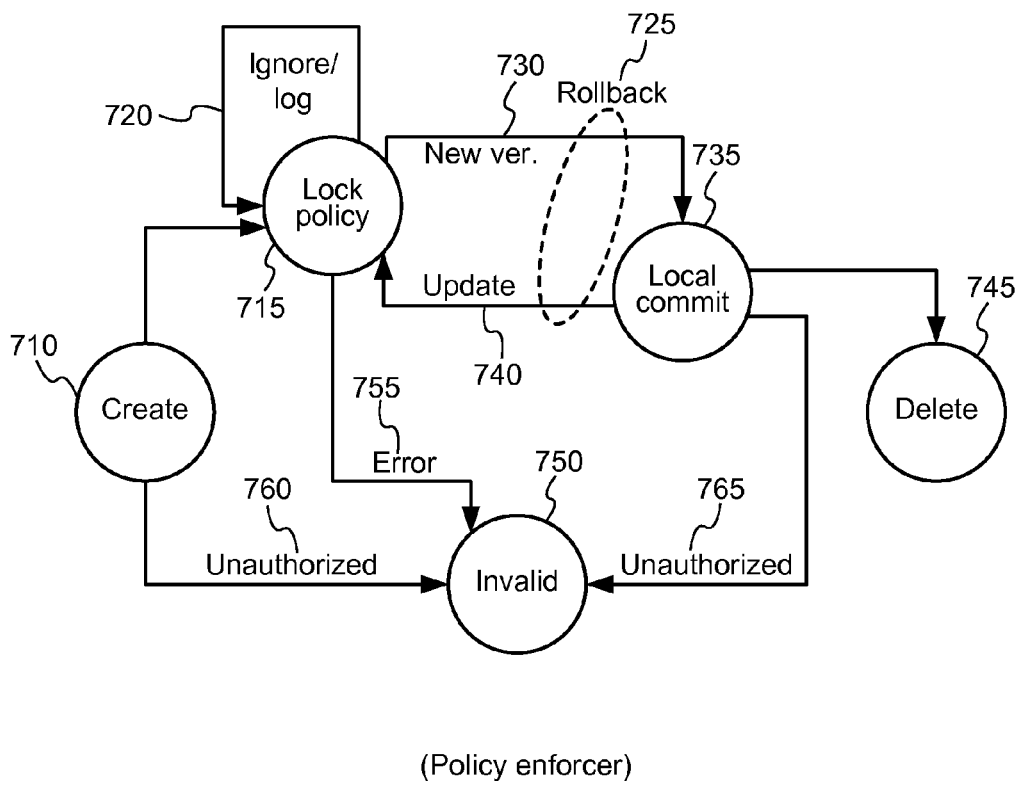
FIG. 7 illustrates an embodiment of a process for enforcing policies through a policy enforcer in accordance with the present invention.

FIG. 7 illustrates an embodiment of a process for enforcing policies through the policy enforcer 120 in accordance with the present invention. In the create state 710, created (or updated) policies are received from a policy manager and a metapolicy transitions to the lock policy state 715. From the lock policy state, a new version metapolicy 730 transitions to the commit policy state 735 where the policy is committed locally in the policy enforcer storage 340 and is available for use.

The committed policy can then be transitioned with a metapolicy to the delete state 745, e.g., when a policy has been updated and the current policy is no longer applicable. The committed policy may also be transitioned to an invalid state 750 through an unauthorized metapolicy 765, e.g., when a user tries to login a predetermined number of times before begin locked out of the service. An unauthorized metapolicy 760 also allows transition from the create state 710 to the invalid sate 750, e.g., when a policy is not acceptable for use with a service. In addition, an error metapolicy 755 transitions from the lock policy state 715 to the invalid state 750, e.g., when a locking error occurs with respect to the policy. From the invalid state 750 rules may be defined (or configured) to undertake a particular action in response to reaching this state, for example, return error message to client 130 or lock out client from further access.

Locally committed policies in the policy enforcer may also be updated. Here, an update policy metapolicy 740 transitions from the local commit state 735 back to the lock policy state 715, where the lock policy state can ignore and/or log 720 update and may also unlock the policy to update it from the create policy state 710. The new version metapolicy 730 and the update metapolicy 740 combination provide a rollback process 725 for previously committed policies.

With respect to invoking the service 140 requested by the client 130 in an embodiment of the policy management system 301, reference again is made to FIG. 3a. Specifically, when client requests a service, e.g., through an XML or SOAP message, that request is picked up by the listener 380. The listener corresponds to the transport layer and below in the OSI model.

Thereafter, the enforcer 370 checks with the policy enforcer framework 345 to determine availability of the service in view of applicable policy (-ies) associated with the service. The policy enforcer framework 345 checks with the policy enforcement storage 340 to determine whether the associated policies for the requested service 140 are committed. If so, the policies are instantiated and the policy container 350 is summoned to manipulate SOAP headers in the context of the request message to trigger enforcement of the policies accordingly. If the policies are not committed, an error or invalid state information is returned to the client 130. Once the policies are in place for enforcement, the policy enforcer framework 345 transfers control to the messenger to invoke the service 140 for the client 130.

As policies are requested and invoked, one of the one or more policy steps 360 includes a policy monitor step communicatively coupled with the monitor 380 to monitor, or track, data (or information) relating to policies at different levels, for example, based on the service, associated policy (-ies), requester, etc. This data is gathered by the monitor 380 and sent back to the policy manager to create a feedback loop. In turn, the policy manager 110 uses this data to update policy or change policy information accordingly.

As an example, the policy design module 315 may update a policy for a particular service based on activity relating to that service. In the example case of a policy requiring login for access to a service that includes access to a secured company Intranet, the monitor may include a feedback that a predefined limit of 100 consecutive failed login attempts has been reached. This may indicate an intrusion attack on the web site. The policy design module 315 may uses this data to update the policy to now redirect subsequent traffic that may continue to try to login to the web site to a new URL that relieves the secured company Intranet of the attacks. Moreover, to prevent adverse affects on legitimate access, the policy may be further refined to identify and bar access from particular Internet Protocol ("IP") addresses.

Figure 3B:
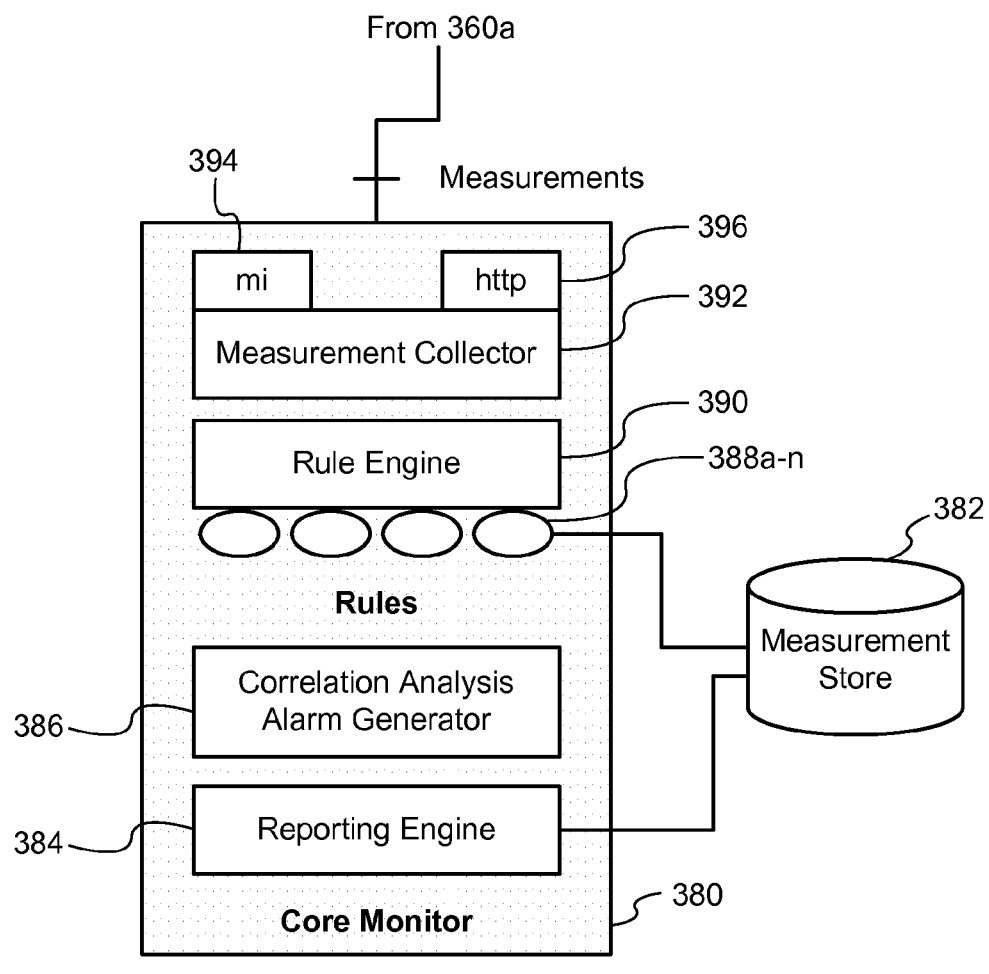
FIG. 3b illustrates an embodiment of a monitor for a policy management system in accordance with the present invention.

FIG. 3b illustrates an embodiment of the monitor 380 for a policy management system 301. The monitor 380 includes a reporting engine 384, correlation analysis and alarm generation engines 386 (may be separated or combined), one or more rules 388a . . . 388n (generally 388), a rule engine 390, a measurement collector 392, one or more interfaces, e.g., RMI 391 or HTTP 396 interfaces, and a measurement storage 382.

Data from the policy steps 360a is received by the one or more interfaces, e.g., 394, 396, and collected in the measurement collector 392. This rules 388, which are stored in the measurement store 382, are applied through the rule engine 390 to begin analyzing the data. The correlation analysis engine 386 further analyzes the data. This data may be fed back to the policy manager 110 through the reporting engine 384 without further refinement.

Alternatively, to reduce the amount of data transmitted, the correlation analysis engine 386 may also determine what, if any, thresholds (alarms) are reached that when reached would feed back information to the policy manager 110 through the reporting engine 384 (and may also be stored) and if not reached would be discarded or stored in the measurement storage 382. Thus, the monitor 380 advantageously provides a data collection, feedback, and analysis and synthesis tool for processing data that allows for automated and real-time policy changes that may be immediately effectuated into the policy management environment.

The present invention also allows for federated policy management. Federated policy management includes having more than one policy manager in a policy management environment. For example, an enterprise may configure a federated policy management architecture to incorporate a division-specific policy managers. These division-specific policy managers may then be coordinated and synthesized at a logically global level to provide a single, consistent view across the enterprise.

An example of application of a federated policy management environment may include enterprises that allow division independent application developments, but require an enterprise wide policy of nonrepudiable messaging to all applications. Policies associated with such developments can be distributed to each policy manager and a central policy enforcer can then be tasked to enforce this policy globally across the enterprise.

Figure 8:
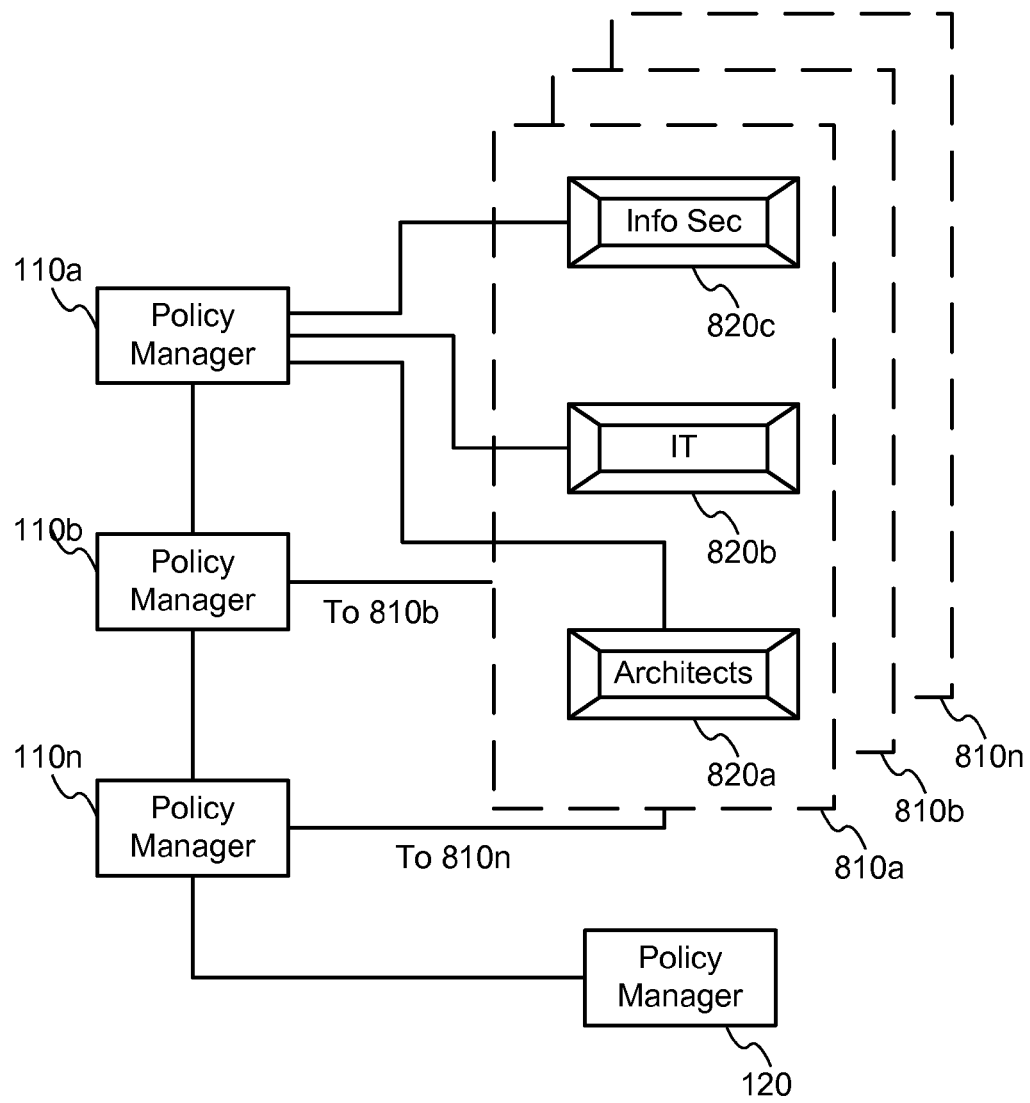
FIG. 8 illustrates an embodiment of a federated policy management in a distributed policy management environment in accordance with the present invention.

FIG. 8 illustrates an example of an embodiment of a federated policy management in a distributed policy management environment in accordance with the present invention. In this example, there are multiple divisions, 810a, 810b, . . . 810n (generally 810), each having a policy manager associated with it. Each policy manager 110a, 110b, . . . 110n manages a policy for different applications, networks, and the like.

In addition, each division may have one or more groups that may set its own policies so that each policy manager 110 may have additional policy managers nested within. In the example, three groups are illustrated—architects 820a, information technology ("IT") 820b, and information security 820c (generally 820). Each of these groups may have its own policies with respect to what security detail to attach to particular services offered by their group.

In this example, the policy managers 110a, 110b, . . . 110n are coupled not only with the respective divisions 810a, 810b, . . . 810n, but also with each other. They may be coupled in serial or parallel. The policy managers synthesize design, management and enforcement within their division, e.g., policy manager 110a within its division 810a, and then globally by coupling with the other policy managers, e.g., 110b . . . 110n, and then through policy enforcer 120 that is configured to provide a global view of the enterprise. Thus, the federated aspects of a policy management environment in accordance with the present invention provides enterprises with tools and processes for timely and consistent service offerings.

As described throughout, the present invention provides a number of advantages and benefits. For example, it beneficially allows for creation, management and enforcement of policies in a manner that aligns business process goals with application development and deployment considerations. It also advantageously provides a policy framework for use in a web services environment to help further application development in a consistent and manageable manner. This decreases development cycle time and increases application availability and consistency. Specifically, control over rules for application development is provided within a framework that requires adherence to in order to make a web service available to an application.

Upon reading this disclosure, those of skill in the art will appreciate still additional alternative structural and functional designs for a system and a process for a policy management system through the principles of the disclosed embodiments. Thus, while particular embodiments and environments have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the present invention as defined in the appended claims.

What is claimed is:

1. In a web services environment, a method for managing application policies, comprising:
   a policy design tool designing a policy for use with a web service;
   a policy manager controller associating the policy with the web service;
   the policy manager controller communicating the policy to a policy enforcement process executed by a policy enforcer for use with the web service;
   the policy enforcer committing the policy to a policy storage;
   the policy enforcer enforcing the policy; a policy monitor monitoring the enforcement of the policy;
   the policy monitor sending feedback data to the policy manager controller based on monitoring the enforcement of the policy;
   the policy manager controller receiving the feedback data from the policy monitor and sending the feedback data to the policy design tool; and
   the policy design tool using the feedback data to automatically change the policy.

2. The method of claim 1, further comprising receiving a confirmation of a status of the policy from the enforcement process.

3. The method of claim 2, wherein the confirmation comprises one from a group consisting of a policy implementation and a policy update.

4. The method of claim 1, further comprising associating the policy with a second web service, an association of with the web service having a different objective than an association of the second web service.

5. The method of claim 4, wherein the web service comprises one from a group consisting of an application, a system operation, and a system function.

6. The method of claim 4, wherein the web service comprises message encryption and the second web service comprises a user login application.

7. A system for policy management in a web services environment, the system comprising:
   a policy manager, the policy manager comprising:
      a policy design tool configured to create a policy for association with a web service;
      a policy storage coupled with the policy design tool and configured to store the policy;
      a policy manager controller coupled with the policy design tool and configured to provide an interface for transmission of the policy to a policy enforcer and configured to receive messages relating to the policy from the policy enforcer;
   the policy enforcer communicatively coupled to the policy manager, the policy enforcer comprising:
      a policy enforcement controller, the policy enforcement controller configured to receive the policy from the policy manager controller and committing the policy;
      a policy enforcement repository communicatively coupled to the policy enforcement controller, the policy enforcement repository configured to store the policy received from the policy manager controller;
      an enforcer module communicatively coupled to the policy enforcement controller, the enforcer module configured to receive a request to enforce the policy;
      a monitor interface configured to receive feedback information relating to enforcement of a policy, the monitor interface coupled with the policy design tool, wherein the policy design tool is further configured to update the policy in response to receiving the feedback information from the monitor interface.

8. The system of claim 7, wherein the policy manager controller further couples with the policy storage.

9. The system of claim 7, further comprising a delegation tool for associating the policy with the web service.

10. The system of claim 7, wherein the policy enforcer transitions the policy from a local commit state back to a lock policy state in response to the policy design tool updating the policy.

11. The system of claim 7, wherein the policy design tool pushes the new policy to the policy manager controller for transmission to the policy enforcer.

* * * * *

UNITED STATES PATENT AND TRADEMARK OFFICE
CERTIFICATE OF CORRECTION

| | | |
|---|---|---|
| PATENT NO. | : 7,757,268 B2 | Page 1 of 1 |
| APPLICATION NO. | : 10/866508 | |
| DATED | : July 13, 2010 | |
| INVENTOR(S) | : Rajiv Gupta et al. | |

It is certified that error appears in the above-identified patent and that said Letters Patent is hereby corrected as shown below:

In column 1, line 9, delete "and" and insert -- and is related to --, therefor.

In column 1, line 11, delete "Environments," and insert -- Environments", --, therefor.

In column 1, line 33, delete "encryption;" and insert -- encryption, --, therefor.

Signed and Sealed this
Tenth Day of May, 2011

David J. Kappos
*Director of the United States Patent and Trademark Office*